July 28, 1925.
B. H. NOELTING ET AL
1,547,230
MOUNT CASTER SLIDE AND SOCKET FOR TUBULAR LEGS
Filed March 28, 1924
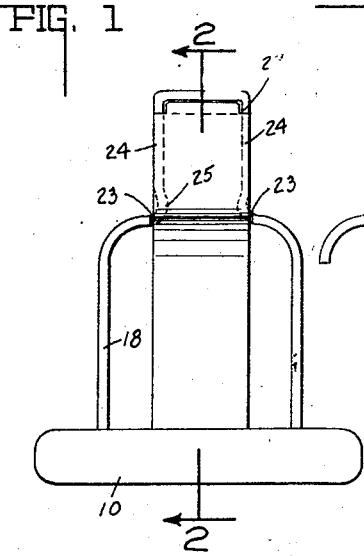
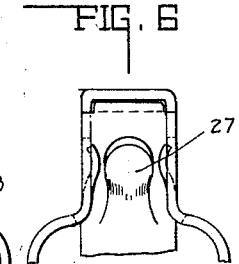
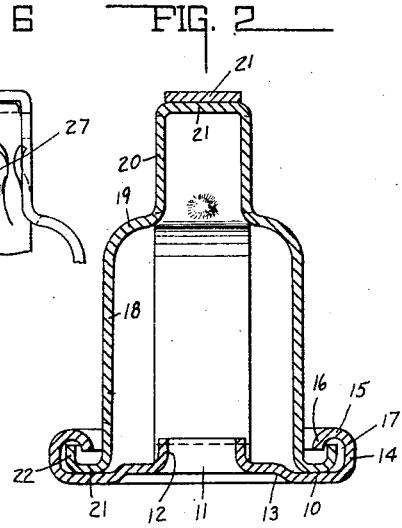
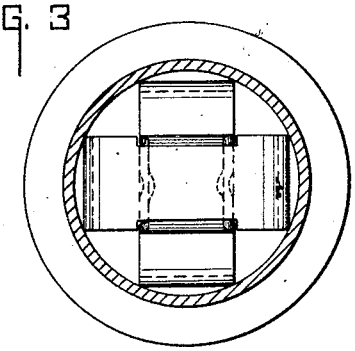
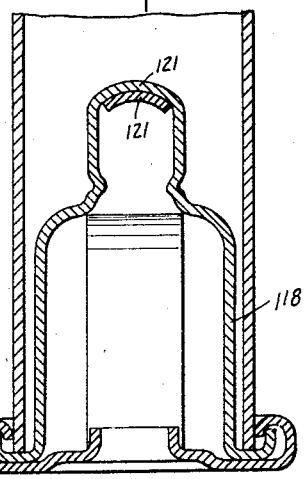
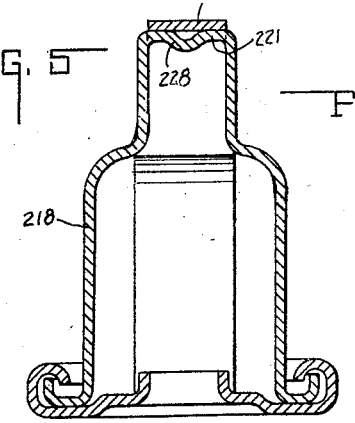
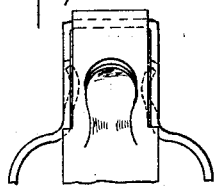
INVENTORS.
BERNHARD H. NOELTING.
EMIL H. SMITHFIELD.
BY
ATTORNEYS.

Patented July 28, 1925.

1,547,230

UNITED STATES PATENT OFFICE.

BERNHARD H. NOELTING AND EMIL A. SMITHFIELD, OF EVANSVILLE, INDIANA, ASSIGNORS TO FAULTLESS CASTER COMPANY, OF EVANSVILLE, INDIANA, A CORPORATION.

LEG-MOUNT-CASTER SLIDE AND SOCKET FOR TUBULAR LEGS.

Application filed March 28, 1924. Serial No. 702,528.

*To all whom it may concern:*

Be it known that we, BERNHARD H. NOELTING and EMIL A. SMITHFIELD, citizens of the United States, and residents of Evansville, county of Vanderburg, and State of Indiana, have invented a certain new and useful Leg-Mount-Caster Slide and Socket for Tubular Legs; and we do hereby declare that the following is a full, clear, and exact description thereof, reference being had to the accompanying drawings, in which like numerals refer to like parts.

This invention relates to a spring frame caster support adapted to support a tubular leg.

The chief object of the invention is to construct a support of the general character indicated in an improved manner, by forming a spring frame from a plurality of crossed spring arms which simultaneously form a headed socket for the head portion of a detachable caster stem, which headed socket is adapted to yieldingly retain the stem but permit forcible removal therefrom. Other portions of the spring arms are associated with a leg supporting plate, said plate being adapted to center said caster stem as well as loosely retain the last-mentioned portions of the spring arms to form a spring frame, and in addition thereto substantially envelope the end of a tubular leg.

The chief feature of the invention consists in forming a spring frame of the character described and associating the same with a leg supporting plate solely through the medium of the ends of the spring frame formed in the manner hereinbefore indicated.

Other features of the invention are not necessarily restricted to the detachable form of caster construction, but it may be pointed out that the detachable form of caster construction permits the caster support constructed as hereinbefore indicated, to serve as a slide when it is not desired to utilize a detachable caster construction for supporting the leg.

The full nature of the invention will be understood from the accompanying drawings and the following description and claims:

In the drawings, Fig. 1 is a side elevational view of one form of a caster and tubular leg support embodying certain features of the invention. Fig. 2 is a longitudinal sectional view taken on the line 2—2 of Fig. 1 and in the direction of the arrows. Fig. 3 is a top plan view thereof. Fig. 4 is a view similar to Fig. 2 and of a modified form of the invention. Fig. 5 is a view similar to Figs. 2 and 4 and is of another modification of the invention. Fig. 6 is a side elevational view similar to a portion of Fig. 1 and is a modification of the invention shown in said figure. Fig. 7 is a side elevational view similar to Fig. 6 and is taken at right angles to that shown in Fig. 6.

In the drawings there is illustrated a leg-supporting and frame-retaining plate 10 having a central aperture 11 defined by a collar or flange 12, which concentric flange 12 is preferably upturned so that said plate 10 may serve as a slide under certain conditions. The plate 10 is dished as at 13. The outer peripheral edge, herein illustrated as annular, is upturned as at 14, inturned as at 15, and downturned as at 16 to form a locking groove 17.

That form of the spring frame construction shown in Figs. 1, 2 and 3 includes a plurality of radially extending spring arms which include a main longitudinal body portion 18 having an inturned portion 19 and a longitudinally extending portion 20, which portions 18 and 20 may be described as substantially parallel. The lower end of the body portion 18, which body portion is adapted to engage the interior wall of the tubular leg as shown is extended outwardly at 21 and upwardly at 22 to form a hook. The hook thus formed upon the end of each spring arm 18 is seatable in the groove formed by the base portion 10 and the annular flange portions 14, 15 and 16. Thus, the free and hook ends of the spring arms are loosely retained by the curled or groove-forming bead of the plate.

In Figs. 1, 2 and 3 it is noted that the upper ends 20 of the spring arms each are connected by an integral connection 21 that bridges the gap therebetween, so that there is formed a tubular socket by means of a pair of U-shaped arms which have overlapping central or connecting portions 21 which form a reenforced head for said socket. As shown in Fig. 1, the U-shaped member which forms the interior portion of the head is recessed or cut away at 22 to form an edge with a shoulder that interlocks with the other U-shaped member. The other U-shaped member at the opposite end of the tubular socket is provided with a shouldered edge 23 which interlocks with the first-mentioned U-shaped member. Thus, the portion 24 of the first-mentioned U-shaped member overlaps the other U-shaped member and forms a groove in which the same may be seated. Likewise, the U-shaped member forming this groove is retained in the groove formed by the other U-shaped member for which purpose the first-mentioned member is reduced as indicated by the numeral 22.

The foregoing construction forms a tubular socket having a reenforced head, which tubular socket is centrally positioned with respect to the entire construction and which is adapted to yieldingly retain therein the head of a stem of a detachable caster. The retaining means may be of any desired or preferred type. Herein, see Figs. 1, 2 and 3, one of the U-shaped members is indented as at 25 to form an abutment for engaging in the reduced portion of a detachable stem. Herein the socket shown in Figs. 1, 2 and 3 is adapted to receive substantially any type of head carried by the stem of a detachable caster.

As shown in Figs. 6 and 7, a modification of the caster stem retaining means may be utilized and the same consists of a tongue 27 which may be struck from opposite portions of the same member or from opposite members, or from all of the members as desired. The foregoing arrangement of the retaining means also applies to that form of the invention shown in Figs. 1, 2 and 3, although therein but the opposite portions of the same member are shown so fashioned. Other forms of caster stem retaining means, known in the art may also be substituted wherever practicable in this type of socket without departing from the broad features of the invention.

In Fig. 4 there is illustrated a modification of the form of the invention shown in Figs. 1, 2 and 3, and herein the same consists of the curved portions 121 of the members 118 which form a curved surface in the socket head adapted to receive the ball-shaped or curved head of a caster stem.

Fig. 5 shows a modified form of the invention, and herein the members 218 are shown provided with a depression 228 in the connecting or head-forming portion 221. Herein the inner member is shown depressed, but if desired, the outer and inner members 221 both may be depressed and thus form an interlocking arrangement in addition to the interlocking arrangement pointed out at the head and at the mouth of the tubular socket formed by the inturned and upwardly and longitudinally extending portions of the spring arms.

It is to be understood that the socket hereinbefore described is adapted to be positioned upon the end of a tubular leg. When thus positioned the end of the leg is positioned between the downturned flange 16 and the spring arms 18. Thus the downturned flange 16 may or may not engage the exterior of the tubular leg as desired, but in either event the same is an ornamental mount for the leg. The interior of the leg is gripped by the longitudinal portions 18 of the spring arms and thus the plate is yieldingly retained upon the tubular leg as well as the spring frame. Also retained through the aforesaid retaining means and construction previously described is the stem of a detachable caster construction. This caster stem also is centered by the collar 12 and by the tubular socket axially positioned thereabove.

While the invention has been described in great detail in the foregoing specifications, the same is to be considered as illustrative and not restrictive in character, for the many modifications, some of which have been illustrated and others of which have been indicated as well, in addition to the many which will readily suggest themselves to those skilled in the art, all are to be considered within the broad purview of the invention, reference being had to the appended claims.

The invention claimed is:

1. A combination caster and tubular leg support comprising a spring frame including more than two longitudinally extending leg engaging arms each having inwardly extending portions which terminate in longitudinally extending portions abutting each other along longitudinal edges to form a tubular socket above the leg engaging portions, the abutting edges of said socket forming longitudinal portions inter-locking to prevent relative movement therebetween.

2. A combination caster and tubular leg support comprising a spring frame including more than two longitudinally extending leg engaging arms each having inwardly extending portions and terminating in longitudinally extending portions to form a tubular socket, said arms at the junction of said tubular socket forming portions and said inwardly extending portions having interlocking shoulders to prevent relative movement therebetween.

3. A combination caster and tubular leg support comprising a spring frame including more than two longitudinally extending leg engaging arms each having inwardly extending portions which terminate in longitudinally extending portions abutting each other along longitudinal edges to form a tubular socket above the leg engaging portions, the abutting edges of said socket forming longitudinal portions interlocking to prevent relative movement therebetween, said arms at the junction of the tubular socket forming portion and the inwardly extending portion having interlocking shoulders to prevent relative movement therebetween.

4. A combination caster and tubular leg support comprising a spring frame including a plurality of pairs of oppositely positioned longitudinally extending leg engaging arms each having inwardly extending portions which terminate in longitudinally extendng portions abutting each other along longitudinal edges to form a tubular socket above the leg engaging portions, the abutting edges of said socket forming longitudinal portions interlocking to prevent relative movement therebetween, opposite arms being connected together and adjacnt arms being crossed to form a reinforced head for said tubular socket.

5. A combination caster and tubular leg support comprising a spring frame including a plurality of pairs of oppositely positioned longitudinally extending leg engaging arms each having inwardly extending portions which terminate in longitudinally extending portions to form a tubular socket, said arms at the junction of said tubular socket forming portions and said inwardly extending portions having interlocking shoulders to prevent relative movement therebetween, opposite arms being connected together and adjacent arms being crossed to form a reinforced head for said tubular socket.

6. A combination caster and tubular leg support comprising a spring frame including a plurality of pairs of oppositely positioned longitudinally extending leg engaging arms each having inwardly extending portions which terminate in longitudinally extending portions abutting each other along longitudinal edges to form a tubular socket above the leg engaging portions, the abutting edges of said socket forming longitudinal portions interlocking to prevent relative movement therebetween, said arms at the junction of the tubular socket forming portion and the inwardly extending portion having interlocking shoulders to prevent relative movement therebetween, opposite arms being connected together and adjacent arms being crossed to form a reinforced head for said tubular socket.

7. A combination caster and tubular leg support comprising a spring frame including a plurality of longitudinally extending leg engaging arms each having inwardly extending portions which terminate in longitudinally extending portions abutting each other along longitudinal edges to form a tubular socket above the leg engaging portions, the abutting edges of said socket forming longitudinal portions interlocking to prevent relative movement therebetween, and a centrally apertured pintle receiving and leg supporting plate, said arms including laterally projecting ends, said plate having a curled substantially peripheral flange for loosely retaining the laterally projecting arms and securing said plate to said arms.

8. A combination caster and tubular leg support comprising a spring frame including a plurality of longitudinally extending leg engaging arms each having inwardly extending portions and terminating in longitudinally extending portions to form a tubular socket, said arms at the junction of said tubular socket forming portions and said inwardly extending portions having interlocking shoulders to prevent relative movement therebetween, and a centrally apertured pintle receiving and leg supporting plate, said arms including laterally projecting ends, said plate having a curled substantially peripheral flange for loosely retaining the lateral projecting arms and securing said plate to said arms.

9. A combination caster and tubular leg support comprising a spring frame including a plurality of longitudinally extending leg engaging arms each having inwardly extending portions which terminate in longitudinally extending portions abutting each other along longitudinal edges to form a tubular socket above the leg engaging portions, said socket forming longitudinal portions interlocking to prevent relative movement therebetween, said arms at the junction of the tubular socket forming portion and the inwardly extending portion having interlocking shoulders to prevent relative movement therebetween, and a centrally apertured pintle receiving and leg supporting plate, said arms including laterally projecting ends, said plate having a curled substantially peripheral flange for loosely retaining the laterally projecting arms and securing said plate to said arms.

10. A combination caster and tubular leg support comprising a spring frame including a plurality of longitudinally extending leg engaging arms each having inwardly extending portions which terminate in longitudinally extending portions abutting each other along longitudinal edges to form a tubular socket above the leg engaging portions, the abutting edges of said socket forming longitudinal portions interlocking to prevent relative movement therebetween, and a centrally apertured pintle receiving and leg supporting plate, said arms including laterally projecting ends, said plate having a curled substantially peripheral flange for loosely retaining the laterally projecting arms and securing said plate to said arms, said peripheral flange substantially enveloping the end of the supported leg and forming a leg mount therefor.

11. A combination caster and tubular leg support comprising a spring frame including a plurality of longitudinally extending leg engaging arms each having inwardly extending portions and terminating in longitudinally extending portions to form a tubular socket, said arms at the junction of said tubular socket forming portions and said inwardly extending portions having interlocking shoulders to prevent relative movement therebetween, and a centrally apertured pintle receiving and leg supporting plate, said arms including laterally projecting ends, said plate having a curled substantially peripheral flange for loosely retaining the lateral projecting arms and securing said plate to said arms, said peripheral flange substantially enveloping the end of the supported leg and forming a leg mount therefor.

12. A combination caster and tubular leg support comprising a spring frame including a plurality of longitudinally extending leg engaging arms each having inwardly extending portions which terminate in longitudinally extending portions abutting each other along longitudinal edges to form a tubular socket above the leg engaging portions, the abutting edges of said socket forming longitudinal portions interlocking to prevent relative movement therebetween, said arms at the junction of the tubular socket forming portion and the inwardly extending portion having interlocking shoulders to prevent relative movement therebetween, and a centrally apertured pintle receiving and leg supporting plate, said arms including laterally projecting ends, said plate having a curled substantially peripheral flange for loosely retaining the laterally projecting arms and securing said plate to said arms, said peripheral flange substantially enveloping the end of the supported leg and forming a leg mount therefor.

13. A combination caster and tubular leg support comprising a spring frame including more than two longitudinally extending leg engaging arms each having inwardly extending portions which terminate in longitudinally extending portions abutting each other along longitudinal edges to form a tubular socket above the leg engaging portions, the abutting edges of said socket forming longitudinal portions interlocking to prevent relative movement therebetween, and an apertured pintle receiving and leg supporting plate, said arms terminating in laterally extending portions for securing the same to the plate and a curled substantially peripheral flange on said plate substantially enveloping the end of the supported leg to form a leg mount.

14. A combination caster and tubular leg support comprising a spring frame including more than two longitudinally extending leg engaging arms each having inwardly extending portions which terminate in longitudinally extending portions to form a tubular socket, said arms at the junction of said tubular socket forming portion and said inwardly extending portions having interlocking shoulders to prevent relative movement therebetween, and an apertured pintle receiving and leg supporting plate, said arms terminating in laterally extending portions for securing the same to the plate and a curled substantially peripheral flange on said plate substantially enveloping the end of the supported leg to form a leg mount.

15. A combination caster and tubular leg support comprising a spring frame including more than two longitudinally extending leg engaging arms each having inwardly extending portions which terminate in longitudinally extending portions abutting each other along longitudinal edges to form a tubular socket above the leg engaging portions, the abutting edges of said socket forming longitudinal portions interlocking to prevent relative movement therebetween, said arms at the junction of the tubular socket forming portion and the inwardly extending portion having interlocking shoulders to prevent relative movement therebetween, and an apertured pintle receiving and leg supporting plate, said arms terminating in laterally extending portions for securing the same to the plate and a curled substantially peripheral flange on said plate substantially enveloping the end of the supported leg to form a leg mount, In witness whereof, we have hereunto affixed our signatures.

BERNHARD H. NOELTING.
EMIL A. SMITHFIELD.